UNITED STATES PATENT OFFICE 2,577,422

PROCESS OF REACTING 1-ALKENE HYDROCARBONS WITH AN ESTER TYPIFIED BY DIETHYL DICHLOROMALONATE

Elbert C. Ladd, Passaic, N. J., assignor to United States Rubber Company, New York, N. Y., a corporation of New Jersey No Drawing. Application May 27, 1949, Serial No. 95,882

5 Claims. (Cl. 260—483)

This invention relates to new chemicals and to a new method for their synthesis. More specifically, my discovery concerns the reaction of esters of dihalogenomalonic acid or of alpha,alpha-dihalogenoacetoacetic acid or the like with monoolefinic 1-alkene hydrocarbons in the presence of a source of free radicals. My invention can be illustrated by the reaction of diethyl dichloromalonate with ethylene:

(1)
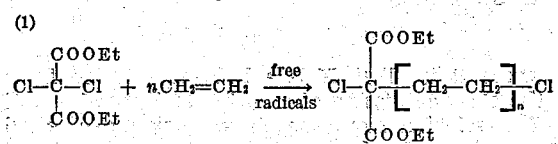

where $n$ is an integer of from 1 to 3 and preferably is 1. My invention can also be illustrated by the reaction of ethyl alpha,alpha-dichloroacetoacetate with ethylene:

(2)
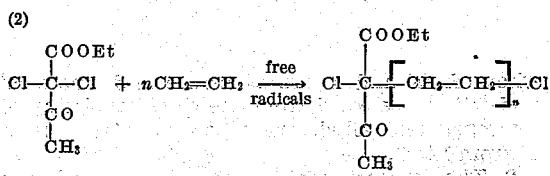

where $n$ is as before.

It is known that dichloroacetic acid esters will react with olefin hydrocarbons in the presence of free radicals, thus:

(3)
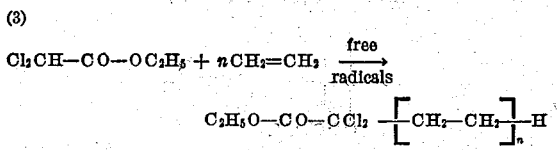

However, as shown in reaction (3), if there is a hydrogen atom attached to the alpha-carbon atom bearing the chlorine substituents, said hydrogen atom is the labile, reactive atom, and the two chlorine atoms are virtually inactive. Hence not only are low yields of product obtained, but the reaction also leads to the formation of mixtures of higher molecular weight materials in which $n$ is greater than 5, particularly where readily polymerizable olefins are used, and very little of the products in which $n$ is from 1 to 3, can be economically obtained. Furthermore, the products from the dichloroacetate are not analogous to those made by the present invention because in the former the alkylene chain derived from the olefin does not have a terminal halogen atom remote from the carboxylic part of the molecule.

As indicated in reaction (4):

(4)
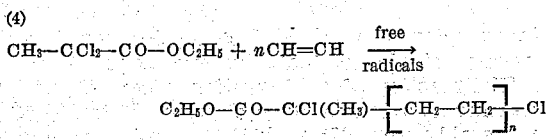

if the dichlorinated alpha-carbon atom bears an alkyl substituent in place of hydrogen, the alpha-halogen atoms do participate in the reaction. However, I have found that the reactivity of such compounds, which have only one carbonyl group linked to the alpha carbon atom, is low, and becomes even lower as the length of the hydrocarbon substituent is increased; again, the yields are poor, and little, if any, of those adducts wherein $n$ is from 1 to 3 are obtained.

I have now discovered that if an alpha,alpha-dihalogenoalkanoate contains as the third substituent on the alpha carbon atom another group linked through carbonyl, the reactivity of the compound towards 1-alkene hydrocarbons is remarkably enhanced, to such an extent that satisfactory yields of those adducts in which $n$ is from 1 to 3, particularly 1, are readily obtained. The highly reactive compounds which I use are seen to be characterized by the grouping —CO—CX$_2$—CO—. One of these carbonyl groups is further linked to alkoxy, and the other to alkyl or alkoxy.

The reaction of my invention can be represented as follows:

(5)
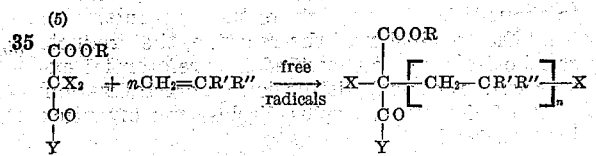

where R is alkyl, X is either chlorine or bromine, Y is alkyl (almost invariably methyl) or alkoxy, R′ and R″ are either hydrogen or alkyl, and $n$ is an integer of from 1 to 3.

Any dialkyl ester of dichloro- or dibromomalonic acid may be used in practicing my invention. While the alkyl groups are usually identical, they may be different. I usually employ diethyl dichloro- or dibromomalonate because of cheapness and ready availability of these compounds. Other examples of esters which can be used are the alpha, alpha-dichloro- and alpha,alpha-dibromo- derivatives of dimethyl malonate, methyl ethyl malonate, dipropyl malonate, ethyl propyl malonate, dibutyl malonate, etc. Preference is given to those esters wherein the alkyl groups are lower alkyl groups.

Similarly any alkyl ester of alpha,alpha-dichloro- or alpha,alpha-dibromoacetoacetic acid may be used. Examples of alkyl groups are methyl, ethyl, propyl, butyl, amyl, etc. Preference is given to the lower alkyl groups.

Instead of esters of alpha,alpha-dihalogenoacetoacetic acid, I may use esters of alpha,alpha-dihalogeno homologs of acetoacetic acid such as those wherein the methyl group attached to the beta-keto carbon atom is replaced by ethyl, propyl, butyl, amyl, hexyl, etc., preference being given to the lower alkyl groups. Esters of alpha, alpha-dihalogenoacetoacetic acid are by far preferred.

Any aliphatic monoolefinic 1-alkene hydrocarbon may be used in the practice of my invention. The hydrocarbon will typically contain from 2 to 20 carbon atoms per molecule. Examples are ethylene, propylene, 1-butene, isobutylene, and any of those pentenes, hexenes, heptenes, octenes, nonenes, decenes, dodecenes, etc., having a single terminal ethylenic group.

The reaction of my invention is carried out by heating at a temperature of from 25° to 200° C., preferably from 60° to 120° C., a mixture of the ester of dihalogenomalonic acid, or of alpha, alpha-dihalogenoacetoacetic acid or the like, with the monoolefinic 1-alkene hydrocarbon in molar ratios of from 1:10 to 20:1, preferably from 1:1 to 15:1, in the presence of a source of free radicals for reaction times which usually range from 5 to 50 hours. In the case of the lower 1-alkenes which are gaseous at ordinary temperatures or at the reaction temperature, it will usually be preferable to carry out the reaction under superatmospheric pressure sufficient to cause the reaction to proceed at a desirable rate.

Suitable promoters for my reaction are those capable of undergoing thermal decomposition to yield free radicals, including peroxidic compounds (e. g., hydrogen peroxide, tertiary-butyl hydrogen peroxide, and acyl peroxides such as benzoyl peroxide and acetyl peroxide), metal alkyls (e. g., sodium ethyl, potassium amyl and lead tetraethyl) and alpha,alpha'-azobis(alpha-alkylalkanoic) acids and derivatives hydrolyzable thereto such as the nitrile, ester and amide (e. g., alpha,alpha'-azobisisobutyric acid, alpha,alpha'-azobisisobutyronitrile, and alpha,alpha'-azobis-(alpha-methylbutyronitrile)). Such compounds are usually employed in amounts ranging from 0.1 to about 15% of the weight of the reactants.

At the conclusion of the reaction, the products can be isolated and purified by preferential extraction, fractional distillation or crystallization.

The following examples disclose my invention in more detail.

*Example 1*

A mixture of 373 grams of ethyl alpha,alpha-dichloro-acetoacetate, 63.5 g. of 1-octene and 5.5 g. of benzoyl peroxide is heated at about 80° C. for 48 hours. The reaction mixture is then evacuated under reduced pressure to remove any unreacted starting materials and the residue is fractionally distilled to yield 50 g. of a new compound, ethyl alpha-chloro-alpha-(2-chlorooctyl)-acetoacetate, b. ca. 125° C./0.3 mm.; $n_D^{20}$ 1.464; per cent chlorine=22.0 (theory=22.8%).

The residue from the distillation contains some 1:2 adduct.

*Example 2*

An autoclave of 1.25 liters capacity and containing 1145 g. of diethyl alpha,alpha-dichloromalonate and 4 g. of benzoyl peroxide is closed and evacuated. Ethylene is then admitted until a pressure of 240 p. s. i. at 70° C. is attained. The reaction is carried out, with agitation, for 21 hours at this temperature and pressure, the latter being maintained by appropriate additions of ethylene.

At the conclusion of the reaction, the autoclave is vented and the residue is fractionally distilled. In this manner are obtained three compounds: (1) diethyl alpha-chloro-alpha-(2-chloroethyl) malonate, b. 86–98° C./2 mm.; $n_D^{20}$ 1.446; (2) a new compound, the 1:2 adduct, believed to be diethyl alpha-chloro-alpha-(4-chlorobutyl) malonate, b. 126–8° C./2 mm.; $n_D^{20}$ 1.458; and (3) a new compound, the 1:3 adduct, believed to be diethyl alpha-chloro-alpha-(6-chlorohexyl) malonate, b. 135–7° C./2 mm.

The products of my invention find use as plasticizers for polymeric materials, and as synthetic intermediates which can be modified by reactions such as hydrolysis, dehydrohalogenation and decarboxylation.

Having thus described my invention, what I claim and desire to protect by Letters Patent is:

1. The process which comprises reacting a monoolefinic 1-alkene hydrocarbon with an ester having the formula

where R is alkyl, X is a halogen selected from the class consisting of chlorine and bromine and Y is selected from the class consisting of alkyl and alkoxy in the presence of free radicals and recovering from the resulting reaction mixture a compound having the formula

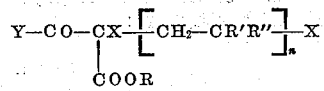

where R, X and Y are as before and where R' and R'' are selected from the class consisting of hydrogen and alkyl, and where $n$ is an integer of from 1 to 3.

2. The process which comprises reacting a monoolefinic 1-alkene hydrocarbon with diethyl dichloromalonate in the presence of free radicals and recovering from the resulting reaction mixture a compound having the formula

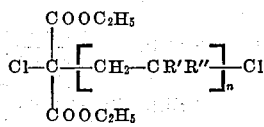

where R' and R'' are selected from the class consisting of hydrogen and alkyl, and where $n$ is an integer of from 1 to 3.

3. The process which comprises reacting ethylene with diethyl dichloromalonate in the presence of free radicals and recovering from the resulting reaction mixture a compound having the formula

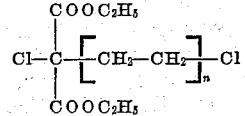

where $n$ is an integer of from 1 to 3.

4. The process which comprises reacting a monoolefinic 1-alkene hydrocarbon with ethyl alpha,alpha-dichloroacetoacetate in the presence of free radicals and recovering from the resulting reaction mixture a compound having the formula

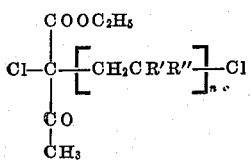

where R' and R'' are selected from the class consisting of hydrogen and alkyl, and where $n$ is an integer of from 1 to 3.

5. The process which comprises reacting 1-octene with ethyl alpha,alpha-dichloroacetoacetate in the presence of free radicals and recovering ethyl alpha-chloro-alpha-(2-chlorooctyl) acetoacetate from the resulting reaction mixture.

ELBERT C. LADD.

REFERENCES CITED

The following references are of record in the file of this patent:

Pesina, Chemical Abstracts 34, columns 425–426 (1940).

Hems, Jour. Chem. Soc. (London) (1944), 626–629.

Adams, Jour. Am. Chem. Soc. 63, 228–236 (1941).

Nicolet et al., Jour. Am. Chem. Soc. 49, 2066–2071 (1927).